United States Patent
Matzig

(10) Patent No.: US 7,424,971 B2
(45) Date of Patent: *Sep. 16, 2008

(54) METHOD AND APPARATUSES FOR OPENING AND CLOSING A CASSETTE

(75) Inventor: Christoph Matzig, Ampfing (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/521,368

(22) Filed: Sep. 15, 2006

(65) Prior Publication Data

US 2007/0063019 A1     Mar. 22, 2007

Related U.S. Application Data

(63) Continuation of application No. 10/143,787, filed on May 14, 2002, now Pat. No. 7,165,717.

(30) Foreign Application Priority Data

May 14, 2001   (DE) ............................ 101 23 383

(51) Int. Cl.
   *G06F 19/00* (2006.01)
(52) U.S. Cl. .................. 235/379; 235/382; 235/486; 705/43
(58) Field of Classification Search .......... 235/379, 235/382, 479, 486; 902/9, 10; 232/15; 705/43
   See application file for complete search history.

(56) References Cited

U.S. PATENT DOCUMENTS

| 4,283,097 A | 8/1981 | Lundblad et al. |
| 4,659,008 A | 4/1987 | Howett et al. ............... 232/43.3 |
| 5,012,075 A | 4/1991 | Hutchison et al. ........... 235/379 |
| 5,233,343 A | 8/1993 | Mazzoni |
| 5,315,656 A | 5/1994 | Devaux et al. |
| 5,436,435 A | 7/1995 | McMillan |
| 5,804,804 A | 9/1998 | Fukatsu et al. |
| 6,014,649 A | 1/2000 | Kobayashi et al. |
| 6,065,408 A | 5/2000 | Tillim et al. |
| 6,082,519 A | 7/2000 | Martin et al. ................ 194/350 |
| 6,125,988 A | 10/2000 | Waters ........................ 194/217 |
| 6,191,690 B1 | 2/2001 | Mukogawa ............... 340/568.7 |
| 6,474,122 B2 | 11/2002 | Davis ......................... 70/278.3 |
| 6,539,755 B1 * | 4/2003 | Bruwer et al. ................. 70/107 |
| 2002/0180582 A1 | 12/2002 | Nielsen ....................... 340/5.6 |

FOREIGN PATENT DOCUMENTS

| DE | 690 08 634 T2 | 7/1990 |
| DE | 691 03 946 T2 | 3/1991 |
| DE | 198 14 165 A1 | 5/1998 |
| DE | 198 39 977 A1 | 9/1998 |
| DE | 100 33 664 A1 | 7/2000 |

(Continued)

*Primary Examiner*—Seung H Lee
(74) *Attorney, Agent, or Firm*—Bacon & Thomas, PLLC

(57) ABSTRACT

A cassette, a control device, an automatic teller and a method for opening and/or closing such a cassette provided wherein the cassette can be opened and/or closed contactlessly by means of establishing a direct radio link between the cassette and a control device in order to open and/or close the plurality of cassettes simultaneously.

14 Claims, 1 Drawing Sheet

FOREIGN PATENT DOCUMENTS

| | | |
|---|---|---|
| EP | 0 030 413 | 8/1981 |
| EP | 0 924 657 A2 | 6/1999 |
| GB | 2 356 427 | 5/2001 |
| WO | 00/14690 | 7/1999 |
| WO | 01/23694 A1 | 4/2001 |

\* cited by examiner

METHOD AND APPARATUSES FOR OPENING AND CLOSING A CASSETTE

METHOD AND APPARATUSES FOR OPENING AND CLOSING A CASSETTE

This application is a continuation of U.S. application Ser. No. 10/143,787 filed on May 14, 2002.

BACKGROUND

1. Field of the Invention

This invention relates to a method for opening and/or closing a cassette for receiving objects of value, such as papers of value or coins. Further, the invention relates to a cassette, a control device and an automatic teller.

2. Description of the Related Art

Such a method and apparatuses are known for example from EP 0 004 436 B1. This print describes a cassette for bank notes that can be opened and closed without a key or the like. For this purpose the cassette is inserted into a docking station so that an electric contact of the cassette locks into a counter-contact of the docking station. The resulting electric signal connection between cassette and docking station is used to open or close the cassette by remote control with the aid of an electromechanical closure means contained in the cassette.

A further system with a cassette to be opened without a key is moreover known from U.S. Pat. No. 5,615,625. Here a cassette is likewise positioned for opening and closing in a docking station so as to form an electric connecting line between the docking, station and a solenoid mechanism in the cassette. Said mechanism is connected with a motor control in the cassette to permit it to be opened and closed by remote control via the electric connecting line between docking station and cassette.

A disadvantage of said two known systems is that the cassette must be inserted into the docking station with high fitting accuracy and only in one orientation to permit the connection between the electric contacts of housing and cassette to be closed.

SUMMARY

On these premises it is the problem of the present invention to provide a method for opening and/or closing a cassette that is simpler and more flexible to handle. A further problem is to provide an associated cassette, a control device for such a cassette and an automatic teller designed for using such a cassette and such a control device.

The present invention was developed on the basis of the finding that cassettes can be opened and closed especially simply by being driven contactlessly by radio.

This makes it possible to dispense with a docking station for opening and closing the cassettes, into which the cassettes must first be inserted with high precision in known systems in order to close the electric connection for transferring the opening or closing signal to the cassette.

Since the drive is effected contactlessly by radio according to the invention, the cassette and the control device need only, for driving the cassette, be located in a room area where a radio link between the two components is guaranteed. The use of a radio link instead of e.g. a magnetic or electric coupling thus leads to much simpler opening or closing of the cassettes.

If the cassette is used for example in an automatic teller for receiving or dispensing bank notes or coins, the control device for radio control of the cassette will preferably be firmly installed in the automatic teller.

Alternatively, it is of advantage to use a mobile transmitting unit as a control device for example when not only one but a plurality of cassettes are to be opened or closed in one operation in a bank or cash-center. The mobile transmitting unit can in this case be e.g. a mobile phone or the like, which the operating person carries and which drives the cassettes regardless of the specific position or arrangement in which are located.

The radio link between the control device and the cassette is preferably designed according to a standardized system, such as the "bluetooth" system.

Use of the "bluetooth" system for example permits, along with cost-effective production of the apparatus elements, also the opening of a plurality of cassettes present in a room area not only one after the other but also largely simultaneously. In comparison to known systems, in which one cassette after the other must be inserted for drive into an associated docking station, this leads to much simpler and more timesaving handling of cassettes.

It is especially preferred to use the radio link not only for controlling opening or closing operations but also for transferring data on the type and/or content of the cassettes. Thus an operating person can, e.g. for stating the value of the content of a plurality of cassettes in a cash-center, use a mobile phone, which he carries, not only to open the cassettes but also to read out the associated cassette data for further use, e.g. for stating the value of the cassette contents. Both opening/closing and reading of cassette data can advantageously also be effected automatically without the operating person having to perform any manual operations on the mobile phone.

According to a further advantageous example, the opening and/or closing operation will moreover only be effected after the control device, or the operating person operating the control device, has obtained the authorization to perform such opening or closing operations on the particular cassette.

For this purpose the control device can e.g. transfer data to the cassette, preferably by means of the signal connection also used for opening and closing the cassette, in order to verify this authorization so that the cassette can only be opened after this verification.

However, it is especially preferred to effect this verification independently of the radio link between cassette and control device, i.e. over another radio link or over a non-radio link. Thus, the operating person's mobile phone serving as a control device for opening and closing the cassettes can be connected for example over another radio or telephone link with a center that sends data to the mobile phone in encrypted fashion so that it can generate or pass on the proper radio signals for opening certain cassettes.

BRIEF DESCRIPTION OF THE DRAWINGS

In the following, further examples of the present invention will be explained and described in more detail with reference to the enclosed drawings, in which.

DETAILED DESCRIPTION OF VARIOUS EMBODIMENTS

Figure 1:
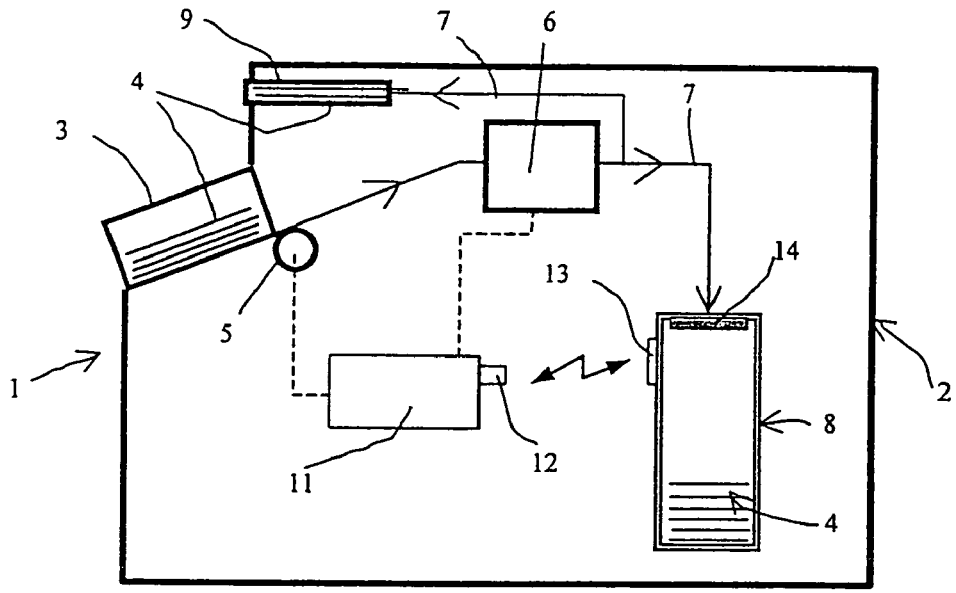
FIG. 1 shows a schematic cross-sectional view of an automatic teller with a cassette and control device according to a first example.

FIG. 1 shows automatic teller 1 according to a first example, in which e.g. bank notes 4 can be deposited. For this purpose, housing 2 of automatic teller 1 has input pocket 3 for inserting bank notes 4 to be deposited, draw-in rolls 5 for drawing in bank notes 4 singly, checking device 6 for checking physical properties of single bank notes 4, and transport device 7 for transporting bank notes 4 singly from input pocket 3 through checking device 6 to be stored in end cassette 8 or to output pocket 9 for returning to the depositor those bank notes 4 which were not recognized by checking device 6 and are therefore not to be stored in end cassette 8.

Further, automatic teller 1 has control device 11 integrated therein, which is connected inter alia with singler 5 and checking device 6 in order to control the singling operation, evaluate the sensor results of checking device 6, and either feed bank notes 4 to cassette 8 or output them to return pocket 9 in dependence on said evaluation.

Automatic teller 1 is characterized in particular by the fact that cassette 8 can be opened and/or closed contactlessly by means of a radio link by control device 11.

For this purpose, control device 11 includes transmitting unit 12 and cassette 8 includes receiving unit 13 mounted in/on the outside of the housing. It is especially preferred to design the two components 12, 13 to form a radio link according to the "bluetooth" standard. A further control device will moreover be present, integrated in receiving unit 13 or alternatively in a component separately contained in cassette 8, for opening or closing cover 14 of cassette 8, through which bank notes are put into cassette 8, by means of an e.g. electromechanical apparatus in dependence on the radiotransmitted signals of control device 11, 12. Moreover, the cassette preferably has a lockable closure element for locking cover 14 in the closed state.

It should be noted that opening a cassette refers according to the present invention to unlocking the closed closure element, i.e. in this case the cover, and/or opening the closure element, and closing a cassette refers to closing the closure element and/or locking the closed closure element.

Further, cassette 8 has integrated therein a storage device for storing data on the content of cassette 8, e.g. on the number and state of inputted bank notes 4 per denomination, or the association of said bank notes 4 with certain transactions.

The apparatus according to FIG. 1 is used for carrying out the inventive method according to a first example as follows.

At the onset of a transaction, i.e. . a deposit operation, an operating person will insert bank notes 4 to be deposited into input pocket 3. Automatically or after a signal inputted by the operating person, inserted bank notes 4 are drawn in singly by draw-in rolls 5 and transported by transport device 6 through checking device 6 in which inter alia their authenticity is checked and their denomination determined. In dependence on the results of the check, non-accepted bank notes 4 are outputted to return pocket 9 and the other bank notes 4 stored in cassette 8.

Directly before bank notes 4 are fed to end cassette 8 at the latest, cover 14 of cassette 8 is unlocked and opened via a signal emitted by radio by transmitting unit 12 of control device 11 and received by receiving unit 13 of cassette 8.

Either after each deposit operation or at least when cassette 8 is to be removed from automatic teller 1 e.g. because it is full, cassette 8 is driven contactlessly by radio again by means of the radio link between transmitting unit 12 and receiving unit 13. It thereby receives both data on the content of the cassette, e.g. on the number and state of bank notes per denomination or on the association of said bank notes with certain transactions, and a signal that causes cover 14 to be automatically closed and locked and permits cassette 8 to be removed for further processing.

Such further processing can consist e.g. in the cassettes filled with bank notes being delivered from a plurality of branches to a central bank office, the bank notes removed and the particular amounts deposited by a customer credited to his account.

Such an operation using a second example of an inventive cassette and control unit will be explained in the following with reference to FIG. 2.

Figure 2:
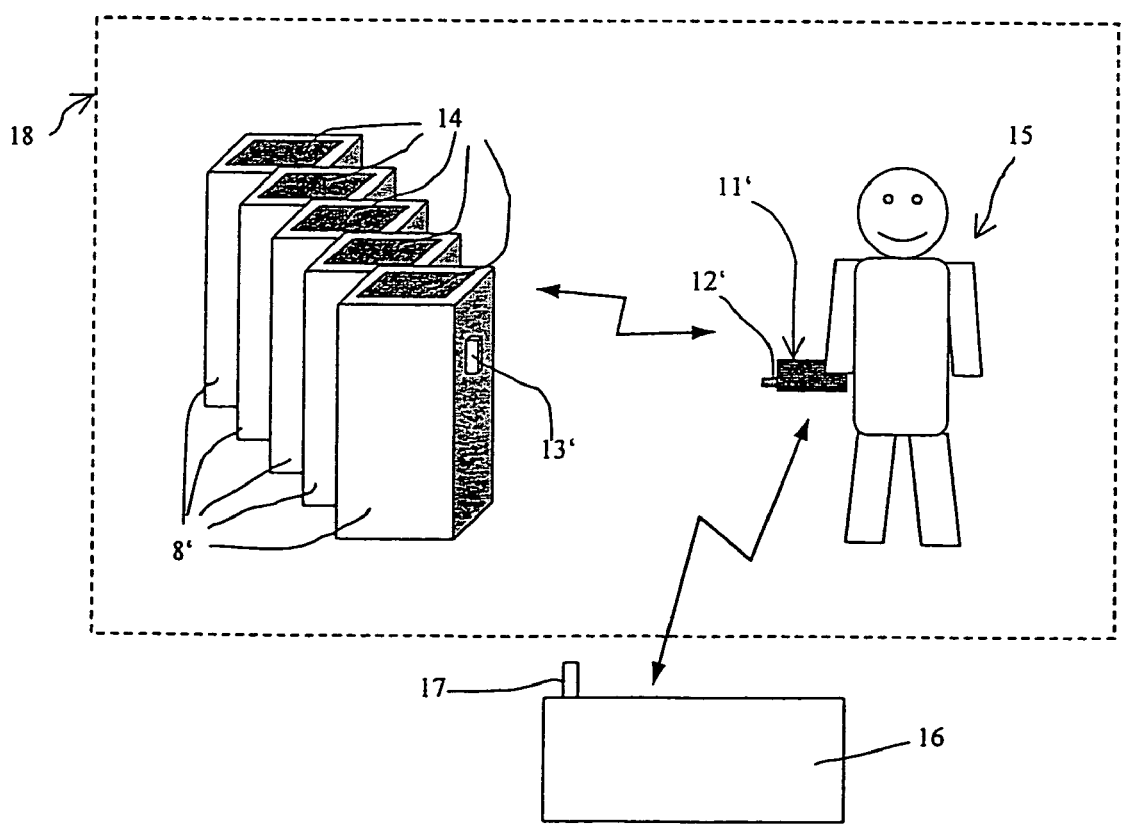
FIG. 2 shows a schematic view of a control device and a plurality of cassettes according to a second example.

In room 18 of the central bank office a plurality of cassettes 8' filled with bank notes, five of which are shown by way of example in FIG. 2, are to be emptied by operating person 15 for further processing.

Cassettes 8' are characterized in particular by radio unit 13' which is designed both for transmitting and for receiving radio signals. The control device for contactless radio control of cassettes 8' is in this case mobile phone 11' with transceiving unit 12'. The link between mobile phone 11' and radio unit 13' is preferably a link on the "bluetooth" standard.

The use of such a radio system, whereby a plurality of subscribers may be contained in the radio circuit, offers the particular advantage for the processing of a plurality of cassettes 8' that mobile phone 11' can be used by operating person 15 to simultaneously open covers 14 of all cassettes 8' which are located within the range of the radio link and/or whose opening and closing codes are known to mobile phone 11'.

Further, mobile phone 11' of operating person 15 is connected via an additional radio or mobile phone link with external check device 16 with radio unit 17. Check unit 16 can be located either in same room 18 as operating person 15 and cassettes 8' or at another place from where the opening of the cassettes or stating of the value of the cassette contents is centrally coordinated and monitored.

The system according to FIG. 2 can be used for carrying out a second example of the inventive method by way of example as follows.

Cassettes 8' from a plurality of branches are delivered for stating the value to room 18 of the central bank office where operating person 15 is located. The operating person will identify himself e.g. by entering a PIN code into mobile phone 11' or with the aid of a biometric sensor integrated into mobile phone 11', such as a fingerprint sensor.

Data for identification and on the content of cassettes 8' are now transferred by radio to mobile phone 11' by means of radio unit 13'. Said data are then transferred to check unit 16 by a radio or telephone link from mobile phone 11' to radio unit 17 in order to credit the deposited amounts to the particular customers.

The data transfer from radio unit 13' to mobile phone 11' and further to check unit 16 can be effected either automatically when the cassettes come into the bluetooth radio range of mobile phone 11', or e.g. by operating person 15 by means of mobile phone 11'.

If operating person 15 is authorized to open those cassettes 8' which have been identified in the aforementioned way, mobile phone 11' receives signals from check device 16 that permit said cassettes 8' to be opened over the bluetooth radio link between mobile phone 11' and radio unit 13'. After the opening of cassettes 8' operating person 15 removes the contained bank notes and supplies them to further processing.

Besides the examples described above, numerous alternatives or variations are of course also possible.

While in the case described above the authorization of mobile phone 11' as control device 11, 11' or of associated operating person 15 to open certain cassettes 8, 8' is verified by data transfer between mobile phone 11' and external check device 16, it is also possible for said verification to be effected between control device 11, 11' and cassette 8, 8' itself For example, a verification system could be present in a memory in cassette 8, 8' that allows cassette cover 14 to be opened only upon a radio signal specific to one control device 11, 11' or a group of control devices 11, 11'.

Further, it should be noted that it is especially preferred to transfer data by radio in encrypted form in all aforementioned cases in order to prevent falsification of the signals, in particular on the type and content of the cassettes to be emptied.

While abovementioned cassette 8 is designed according to the first example solely for receiving deposited bank notes 4, it is also possible to use either the same cassette 8 in automatic teller 1 or a further cassette also for dispensing bank notes 4 to the operating person.

In this case, the radio link between control device 11 and the cassette would be used for closing the cover of the cassette when the cassette is to be removed, for example because no bank notes or only a minimal predetermined number of bank notes are contained in the cassette. Moreover, in this case, data on the type and content of the cassette are transferred by radio to control device 11 over the radio link upon insertion of the cassette into automatic teller 1.

In this connection it is not only conceivable for cassette 8, 8' to be closed automatically by means of the radio link before it is removed from the automatic teller, e.g. according to FIG. 1, but also in cases where it is removed e.g. from room area 18 or the radio link range between cassette 8' and mobile phone 11'.

Finally, it should be emphasized that control device 11, 11' for contactless radio control of cassettes 8, 8' may be not only mobile phone 11, 11' but also another, e.g. mobile, unit that is equipped with a possibility of forming a radio link.

As mentioned above, the inventive use of a radio link for opening and closing the cassettes allows, among other things, cassettes delivered in large quantities to be processed in a shorter time than in known systems in which individual cassettes must be positioned in a docking station one after the other. If a radio system such as the "bluetooth" standard is moreover used, a plurality of cassettes can be opened simultaneously and automatically, which further reduces the processing time.

The invention claimed is:

1. A method for opening and/or closing a plurality of cassettes for receiving banknotes, comprising the steps of;
    delivering the plurality of cassettes from a plurality of automatic teller machines for dispensing and/or receiving banknotes to a common room area;
    simultaneously connecting the plurality of cassettes in the common room area by a direct radio link with a control device to open and/or close the plurality of cassettes simultaneously.

2. The method according to claim 1, further comprising the step of transferring data on the type and content of the cassette over the radio link between the cassette and the control device.

3. The method according to claim 2, wherein the control device includes a mobile phone.

4. The method according to claim 1, including using the control device to open and close a plurality of cassettes present at different positions in a room area.

5. The method according to claim 1, further comprising the step of performing a verification operation for confirming the authorization of the control device for opening and/or closing operations on the cassette prior to opening and/or closing the cassette.

6. The method according to claim 5, wherein the data for verification are transferred by means of the radio link between the cassette and the control device or independently of the radio link between the cassette and the control device.

7. The method according to claim 1, wherein the cassette is used in an automatic teller for dispensing and/or receiving papers of value and/or coins, and the cassette is closed automatically in the automatic teller after at least one predetermined criterion has been fulfilled.

8. The method according to claim 1, wherein the cassette includes a lockable closure element, and the step of closing the cassette includes closing the closure element and/or locking the closed closure element, and the step of opening the cassette includes unlocking the closed closure element and/or opening the closure element.

9. The method according to claim 7, wherein said predetermined criterion includes a given fill level of papers of value and/or coins in the cassette.

10. The method according to claim 1, prior to delivering the cassettes, further comprising the step of closing the cassettes via a direct radio link and then removing the cassettes from the automatic teller machines.

11. A control device for cassettes from automatic teller machines for dispensing and/or receiving banknotes, wherein the control device is arranged to be connected simultaneously by a direct radio link with the plurality of cassettes to open and/or close the plurality of cassettes contactlessly;
    wherein the control device includes a stationary or mobile transmitting unit to permit the plurality of cassettes to be opened and/or closed contactlessly by radio when the plurality of cassettes is located at different positions in a room area within the range of the radio link.

12. The control device according to claim 11, wherein the control device is connectable with a check device, the control device being arranged to transmit data to the check device and/or for receiving data from the check device for verifying the authorization of the control device for opening and/or closing operations.

13. The control device according to claim 12, wherein the control device is connectable with the check device by means of the radio link between the cassette and the control device or independently of the radio link between the cassette and the control device for transmitting data for verification to the check device and/or receiving them.

14. A system comprising:
    a plurality of cassettes arranged for receiving a plurality of bank notes, each of the cassettes having a cover;
    an automatic teller machine adapted for accommodating at least one of the cassettes for receiving and dispensing bank notes therefrom; and
    a control device arranged for simultaneously connecting by a direct radio link to the plurality of cassettes in order to open or close the cover of the cassettes when the plurality of cassettes is located at different positions in a room area within the range of the radio link.

* * * * *